Nov. 22, 1932.  J. B. TEESDALE  1,888,298
GAUGE
Filed May 25, 1931
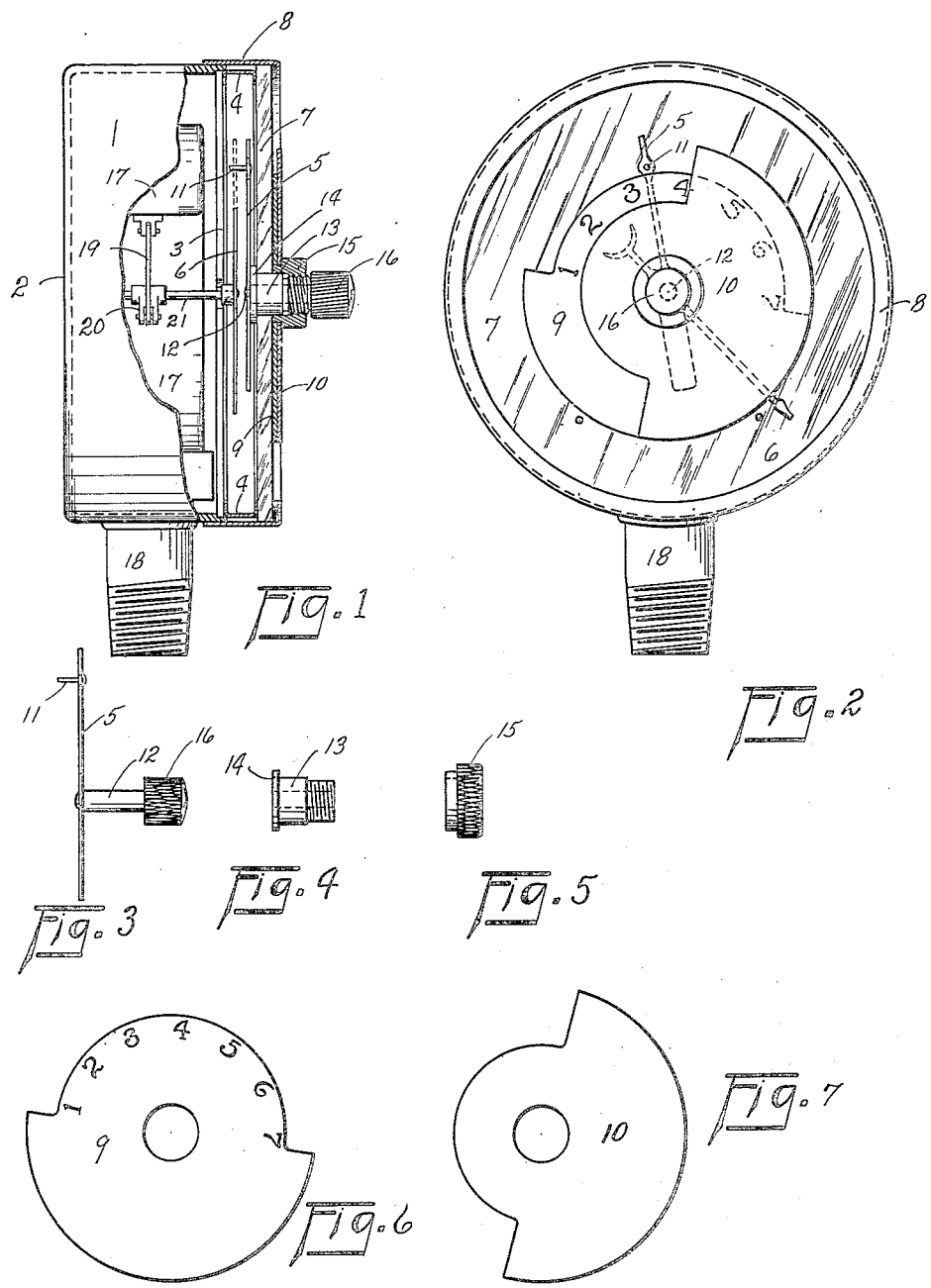
Witness:
Geo L. Chapes
Inventor
John B. Teesdale
By
Rice and Rice
Attorneys Patented Nov. 22, 1932

1,888,298

UNITED STATES PATENT OFFICE

JOHN B. TEESDALE, OF GRAND RAPIDS, MICHIGAN, ASSIGNOR TO TEESDALE MANUFACTURING COMPANY, OF GRAND RAPIDS, MICHIGAN, A CORPORATION OF MICHIGAN

GAUGE

Application filed May 25, 1931. Serial No. 539,768.

The present invention relates to gauges and more particularly to gauges for determining the quantity of liquid within a supply tank. The device herein shown and described is a modification of the device shown in the copending application Serial No. 538,226 filed the 18th day of May, 1931, by Claude R. Rich and by him assigned to my assignee.

The main objects of the invention are to provide a gauge of the character above indicated which is particularly adaptable for use in oil burner installations of both gravity and vacuum feed type; to provide means for adjusting a gauge whereby it may be made adaptable for supply tanks having varying lifts; and, to provide means for indicating the amount of liquid within the supply tank at times when no liquid is being withdrawn therefrom.

An illustrative embodiment of the invention is shown in the accompanying drawing, wherein:

Figure 1 is a side elevational view of the gauge partly broken away to show the interior operating parts;

Figure 2 is a front elevational view thereof;

Figure 3 is a side elevational view of one of the indicating pointers having a stem and thumb nut for manual resetting;

Figure 4 is a side elevational view of a stem sleeve member;

Figure 5 is a side elevational view of a sleeve nut;

Figure 6 is a front elevational view of the dial per se; and

Figure 7 is a front elevational view of the blind for blanking predetermined lift indicia on the dial.

The gauge herein shown and described is designed for use in conjunction with oil-burner installations for indicating the amount of oil in the supply tank. The instrument is installed in the suction line between the oil supply tank or reservoir and the booster pump in vacuum feed systems and in the oil feed line between the supply tank and the burner in gravity feed burners.

In oil-burner installations generally, the oil supply tanks seldom have a cross-sectional width of more than seven feet and generally average a four or five foot lift. As will be understood by those skilled in the art to which this invention relates, the lift in vacuum feed systems is determined by the vertical foot distance between the oil level in the supply tank and the level of the booster pump. In gravity feed systems, the lift is determined by the vertical foot distance between the oil level in the supply tank and the oil delivering nozzle of the burner. The size or shape of the tank, of course, has no effect upon the lift in either vacuum or gravity feed systems.

Referring to the drawing in which like parts are designated by the same numbers in the several views, a gauge having a cylindrical housing 1 with a closed back 2 has an open front covered by a disc 3 which is retained by a ring 4 which provides lateral spacing for the pointers 5 and 6 hereinafter more fully described.

A transparent glass disc 7 is retained against the outer peripheral flange of the ring 4 by a cup 8 of slightly greater diameter than the cylindrical housing 1 which it embraces. This cup is provided with an open face and a manually rotatable dial 9 bearing against the outer surface of the glass disc is provided with numerical indicia reading from 1 to 7 as indicated in Figures 2 and 6 for adapting the gauge to installations of varying lifts as hereinafter explained. A manually rotatable blind 10 having a segmental portion cut therefrom is adjustably mounted over the dial for blanking predetermined lift indicia on the dial as indicated in Figure 2.

The pointer 6 provided with a laterally extending pin 11 near its upper end, is rigidly secured to a stem 12 which passes through the glass disc 7, dial 9 and blind 10. A screw threaded sleeve or thimble 13 having an annular flange 14 is slid upon the stem 12 and extends through the glass disc. A thumb nut 15 is screwed to the sleeve for retaining the pointer 5, glass disc 7, dial 8 and blind 10 in assembled relation as best shown in Figure 1. The stem 12 is provided with a knurled thumb nut 16 for manually resetting the pointer 5 each time the supply tank is refilled as hereinafter more fully described.

A hollow metallic circular diaphragm member 17 within the cylindrical housing, sealed at its upper end and communicating with the threaded nipple 18 at its lower end, is of a conventional type and is flexed by the suction or pressure withdrawal of the liquid from the supply tank. A link 19 is pivotally connected to the upper end of the diaphragm member and to the yoke 20 which is rigidly secured to the stem 21 to whose outer end is secured the pointer 6. Flexing of the diaphragm member by pressure or suction caused by withdrawal of the liquid from the supply tank thus causes the pointer 6 to revolve. As the pointer 6 is thus caused to revolve, it comes in contact with the laterally projecting pin 11 causing the pointer 5 to likewise revolve whereby a reading of the quantity of liquid is given at times when no liquid is being withdrawn from the supply tank.

In actual initial installations, the supply tank is filled and the pump is started which causes the pointer to revolve to a given position from the "dead" position shown in Figure 1 to the exemplified position shown in Figure 2. Assuming the tank has a four-foot diameter or cross sectional width, the dial 9 is manually rotated so that the pointer is over the numeral 4 thereon and the blind 10 is then manually rotated so that the numerals 5 to 7 inclusive are blanked out since they are of no use in the installation here exemplified.

As the liquid within the supply tank is withdrawn, the pointer is caused to be moved toward the left. Thus for example, if the tank has a 400 gallon capacity, the pointer as indicated in Figure 2 would indicate that the liquid within the tank is a trifle less than one-quarter depleted or contains a little more than 300 gallons of fuel.

It will thus be seen that a reading may be obtained from the manually movable pointer at times when no liquid is being withdrawn from the supply tank since this pointer is caused to move by the revolving of the diaphragm-operated pointer and to remain at a point to which it is thus moved when the diaphragm-operated pointer moves back upon cessation of liquid withdrawal from the tank. It will be understood, of course, that the manually movable pointer should be reset with each refilling of the supply tank to insure a correct reading.

While but one specific embodiment of this invention has been herein shown and described, it will be understood that numerous details of the construction shown may be altered or omitted without departing from the spirit of this invention as defined by the following claims.

I claim:

1. In a gauge for determining the quantity of liquid within a supply tank having a nipple adapted to be inserted in feed line from the supply tank, a dial bearing lift indicia, a pointer operable by the liquid withdrawal from the supply tank for indicating the amount of liquid within said tank during withdrawal of liquid therefrom, a second pointer operable by the first pointer for indicating the amount of liquid within said tank irrespective of liquid withdrawal therefrom, and an adjustable blind for blanking predetermined lift indicia whereby the gauge is adaptable for use with a tank having a given lift within the range of the indicia on said dial.

2. In a gauge for determining the quantity of liquid within a supply tank having a nipple adapted to be inserted in feed line from the supply tank, a dial bearing lift indicia, a pointer operable by the liquid withdrawal from the supply tank for indicating the amount of liquid within said tank during withdrawal of liquid therefrom, a second pointer operable by the first pointer for indicating the amount of liquid within said tank irrespective of liquid withdrawal therefrom, and an adjustably rotatable blank mounted over said dial and having a segmental portion cut therefrom for disclosing predetermined lift indicia whereby the gauge is adaptable for use with a tank having a given lift within the range of the indicia on said dial.

3. In a gauge for determining the quantity of liquid within a supply tank having a nipple adapted to be inserted in feed line from the supply tank, a dial bearing lift indicia, a pointer operable by the liquid withdrawal from the supply tank for indicating the amount of liquid within said tank during withdrawal of liquid therefrom, a second pointer operable by the first pointer for indicating the amount of liquid within said tank irrespective of liquid withdrawal therefrom, said second pointer having resetting means, and an adjustable blind for blanking predetermined lift indicia whereby the gauge is adaptable for use with a tank having a given lift within the range of the indicia on said dial.

4. In a gauge for determining the quantity of liquid within a supply tank having a nipple adapted to be inserted in feed line from the supply tank, a manually rotatable dial bearing lift indicia, a pointer operable by the liquid withdrawal from the supply tank for indicating the amount of liquid within said tank during withdrawal of liquid therefrom, a second pointer operable by the first pointer for indicating the amount of liquid within said tank irrespective of liquid withdrawal therefrom, and an adjustable blind for blanking predetermined lift indicia whereby the range is adaptable for use with a tank having a given lift within the range of the indicia on said dial.

5. In a gauge for determining the quantity of liquid within a supply tank having a nipple adapted to be inserted in feed line from the supply tank, a manually rotatable dial bearing lift indicia, a pointer operable by the liquid withdrawal from the supply tank for indicating the amount of liquid within said tank during withdrawal of liquid therefrom, a second pointer operable by the first pointer for indicating the amount of liquid within said tank irrespective of liquid withdrawal therefrom, and an adjustably rotatable blank mounted over said dial and having a segmental portion cut therefrom for disclosing predetermined lift indicia whereby the gauge is adaptable for use with a tank having a given lift within the range of the indicia on said dial.

6. In a gauge for determining the quantity of liquid within a supply tank having a nipple adapted to be inserted in feed line from the supply tank, a manually rotatable dial bearing lift indicia, a pointer operable by the liquid withdrawal from the supply tank for indicating the amount of liquid within said tank during withdrawal of liquid therefrom, a second pointer operable by the first pointer for indicating the amount of liquid within said tank irrespective of liquid withdrawal therefrom, said second pointer having resetting means, and an adjustable blind for blanking predetermined lift indicia whereby the gauge is adaptable for use with a tank having a given lift within the range of the indicia on said dial.

In testimony whereof I have hereunto set my hand at Grand Rapids, Michigan, this 15th day of May, 1931.

JOHN B. TEESDALE.